(12) United States Patent
Matsui et al.

(10) Patent No.: US 6,228,924 B1
(45) Date of Patent: May 8, 2001

(54) CALCIUM-IRON OXIDE COMPOSITE PARTICLES AND RESIN MOLDED PRODUCT CONTAINING THE SAME

(75) Inventors: Toshiki Matsui; Masaru Isoai; Yasuhiko Fujii, all of Hiroshima; Satoshi Hatakeyama, Hiroshima-ken; Tomoko Okita, Hatsukaichi; Tomoyuki Imai, Hiroshima, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/219,853

(22) Filed: Dec. 23, 1998

(30) Foreign Application Priority Data

Dec. 26, 1997 (JP) .................................................. 9-369365

(51) Int. Cl.$^7$ ........................................................ C08K 3/18
(52) U.S. Cl. .................................................... 524/430
(58) Field of Search ............................................. 524/430

(56) References Cited

U.S. PATENT DOCUMENTS 4,434,063 * 2/1984 Kageyama ............................. 252/25

FOREIGN PATENT DOCUMENTS 0 541 329   5/1993 (EP) .
0 623 555  11/1994 (EP) .

OTHER PUBLICATIONS

Derwent Publications Ltd., London, GB; Section Ch, Week 9420, XP002099958 European Search Report.

* cited by examiner

Primary Examiner—Paul R. Michl
(74) Attorney, Agent, or Firm—Nixon & Vanderhye

(57) ABSTRACT

Calcium-iron oxide composite particles of the present invention have a BET specific surface area of 0.1 to 100 $m^2/g$ and containing iron atom in an amount of 1 to 500 moles based on 100 moles of calcium atom, the iron atom of not less than 50% based on the total amount of iron atom contained in said calcium-iron oxide composite particles being bonded with calcium atom for forming a calcium-iron ferrite phase.

A hydrogen chloride-scavenger comprising the calcium-iron oxide composite particles, is capable of effectively capturing harmful hydrogen chloride generated by thermal decomposition or combustion of chorine-containing resin molded products upon fire or incineration thereof, and fixing the hydrogen chloride as stable calcium chloride or the like.

4 Claims, 1 Drawing Sheet

CALCIUM-IRON OXIDE COMPOSITE PARTICLES AND RESIN MOLDED PRODUCT CONTAINING THE SAME

BACKGROUND OF THE INVENTION

The present invention relates to calcium-iron oxide composite particles and a resin molded product containing the calcium-iron oxide composite particles. More particularly, the present invention relates to calcium-iron oxide composite particles, a hydrogen chloride-scavenger comprising the calcium-iron oxide composite particles, which is capable of effectively capturing harmful hydrogen chloride generated by thermal decomposition or combustion of chorine-containing resin molded products upon fire or incineration thereof, and fixing the hydrogen chloride as stable calcium chloride or the like, and a chlorine-containing resin molded product composed mainly of a chlorine-containing resin and the hydrogen chloride-scavenger dispersed.

The chlorine-containing resin molded products according to the present invention can be used as interior and exterior building materials such as blinds, wall papers, flooring materials, outer walls or tubs; materials for transportation means such as automobiles, vehicles, ships or airplanes; structural materials for machineries, equipments, apparatuses, etc.; agricultural materials for greenhouse culture of agricultural products, etc.; or materials for various other application fields.

Chlorine-containing resins such as polyvinyl chloride, polyvinylidene chloride or chlorinated polyethylene which are generally used as raw materials for molded resin products, have been mass-produced and widely used in various application fields because of inexpensiveness and excellent processability thereof. In particular, in Japan, polyvinyl chloride have been currently mass-produced in an amount as large as about 2,300,000 tons a year.

However, when resin molded products composed of such chlorine-containing resins are burnt upon fire or used resin molded products are incinerated, the chlorine-containing resins are thermally decomposed by heating, so that a large amount of harmful hydrogen chloride derived from chlorine in the resins is generated. Consequently, such chlorine-containing resin molded products has caused significant social problems such as damage to human bodies and other organisms or environmental pollution, e.g., air pollution.

On the other hand, from the standpoints of safety, hygiene or environmental protection, it has been studied to replace the chlorine-containing resin molded products with resin molded products containing no chlorine. However, with increase in amount of caustic soda (sodium hydroxide) produced, since a large amount of chlorine gas has been generated and the large amount of chlorine-containing resins has been also produced, it is not easy to replace the chlorine-containing resin molded products with other resin molded products containing no chlorine.

In consequence, it has been strongly demanded to provide a chlorine-containing resin molded product which can be sufficiently prevented from generating harmful hydrogen chloride even upon fire or incineration.

Hitherto, hydrogen chloride generated from the chlorine-containing resin molded products upon combustion or incineration thereof, have been treated and removed by a method of absorbing hydrogen chloride into slaked lime due to the reaction therebetween, a method of neutralizing hydrogen chloride with caustic soda, or the like.

There is also known a method of adding calcium carbonate as a hydrogen chloride-scavenger to the reaction system when the chlorine-containing resin composition is thermally decomposed and converted into a liquid fuel, and reacting the calcium carbonate with hydrogen chloride generated upon the thermal decomposition, thereby fixing the hydrogen chloride as calcium chloride (Japanese Patent Application Laid-open (KOKAI) No. 56-122894(1981)).

Further, there is known a method of removing hydrogen chloride by allowing calcium carbonate particles and iron oxide particles to co-exist upon incineration of the chlorine-containing resins, the calcium carbonate particles and the iron oxide particles being granulated with an organic binder (Japanese Patent Application Laid-open (KOKAI) No. 8-82411(1996)).

Further, there is known a method of burning combustible wastes at a temperature of not less than 850° C. under the co-existence of calcium compound particles and iron oxide particles, thereby removing hydrogen chloride generated (Japanese Patent Application Laid-open (KOKAI) No. 8-270924(1996)).

Furthermore, there is known a chlorine-containing resin composition produced by blending a hydrogen chloride-scavenger composed of lithium carbonate particles or the like and iron oxide particles with a chlorine-containing resin, wherein the dehydrochlorination reaction by the hydrogen chloride-scavenger is promoted by catalytic action of the iron oxide particles (Japanese Patent Application Laid-open (KOKAI) No. 9-241458(1997)).

More specifically, in Japanese Patent Application Laid-open (KOKAI) No. 9-241458(1997), there has been described a chlorine-containing resin composition produced by blending at least one kind of carbonate particles selected from the group consisting of lithium carbonate, sodium carbonate and magnesium carbonate, and iron oxide particles into a chlorine-containing resin, so that the amount of the carbonate particles is not more than one equivalent based on chlorine in the resin, and the amount of the iron oxide particles is 1 to 10% by weight based on the weight of the carbonate particles However, the above-mentioned prior arts have the following problems.

That is, in the case of the reacting and absorbing method using slaked lime or the neutralizing and washing method using caustic soda, hydrogen chloride is not suppressed from being generated, but the hydrogen chloride already generated is treated subsequently. Therefore, in particular, damages to human bodies and other organisms upon fire or environmental pollution cannot be inhibited.

Further, in the case of the reacting and absorbing method, an efficiency of the reaction between hydrogen chloride and slaked lime is low, so that in order to achieve an effective chlorine-fixativity, it is necessary that the slaked lime is used in such a large amount at least three times the theoretical equivalent required for the reaction with hydrogen chloride, thereby causing problems such as increase in treating costs.

In addition, since unreacted slaked lime contains dioxin showing a strong toxicity, there is caused such a disadvantage that the unreacted slaked lime must be converted into harmless substances before disposal. Further, expensive facilities are required to uniformly disperse the slaked lime.

In the method described in Japanese Patent Application Laid-open (KOKAI) No. 56-122894(1981), hydrogen chloride cannot be sufficiently inhibited from being generated. Further, in this method, the efficiency of reaction between hydrogen chloride and calcium carbonate is low, so that in order to achieve an effective chlorine-fixativity, it is necessary that the calcium carbonate is used in such a large amount at least five times the theoretical equivalent required for the reaction with hydrogen chloride, thereby causing problems such as the increase in treating costs.

In the methods described in Japanese Patent Application Laid-open (KOKAI) Nos. 8-82411(1996) and 9-241458 (1997) in which a hydrogen chloride-scavenger composed of carbonate particles such as calcium carbonate particles or lithium carbonate particles and the iron oxide particles are mixed and blended with the chlorine-containing resin, when the temperature is excessively increased upon heating, the decomposition reaction such as dehydrochlorination reaction or polyene-forming reaction is accelerated at a part of the chlorine-containing resin by catalytic action of the iron oxide particles, thereby causing problems such as deterioration in quality and properties of the resin accompanying with discoloration thereof, etc.

Further, in the methods described in Japanese Patent Application Laid-open (KOKAI) Nos. 8-82411(1996), 8-270924(1996) and 9-241458(1997), hydrogen chloride-capturing reaction by the hydrogen chloride-scavengers is accelerated by the catalytic action of the iron oxide particles, thereby preventing the generation of hydrogen chloride to some extent. However, the generation of hydrogen chloride cannot be sufficiently inhibited by these methods. In the method described in Japanese Patent Application Laid-open (KOKAI) No. 9-241458(1997), it is required to use expensive lithium carbonate particles or the like. Therefore, the method is industrially disadvantageous.

In view of the above-mentioned problems, it has been strongly demanded to provide a hydrogen chloride-scavenger capable of sufficiently capturing hydrogen chloride generated from chlorine-containing resin molded products upon fire or incineration thereof, and preventing the chlorine-containing resins from being deteriorated in quality and properties.

As a result of the present inventors' earnest studies, it has been found that by allowing calcium-iron oxide composite particles having a BET specific surface area of 0.1 to 100 $m^2/g$ and an iron atom content of 1 to 500 moles based on 100 moles of calcium atom wherein not less than 50% of the iron atom forms a calcium-iron ferrite phase, to exist upon. incineration of a chlorine-containing resin, harmful hydrogen chloride generated by thermal decomposition or combustion of the chlorine-containing resin can be effectively captured and fixed. The present invention has been attained on the basis of the finding.

SUMMARY OF THE INVENTION

It is an object of the present invention to provide calcium-iron oxide composite particles and a hydrogen chloride-scavenger comprising, which is capable of effectively capturing harmful hydrogen chloride generated by thermal decomposition or combustion of a chlorine-containing resin molded product upon fire or incineration thereof, and fixing the hydrogen chloride as stable calcium chloride or the like.

It is another object of the present invention to provide to a chlorine-containing resin composition capable of sufficiently preventing hydrogen chloride from being generated upon fire or incineration thereof, and showing hardly the deterioration in quality and properties when molded.

To accomplish the aim, in a first aspect of the present invention, there is provided calcium-iron oxide composite particles having a BET specific surface area of 0.1 to 100 $m^2/g$ and an iron atom content of 1 to 500 moles based on 100 moles of calcium atom, the iron atoms of not less than 50% based on the total amount of the iron atoms contained in the calcium-iron oxide composite particles being bonded with calcium atom for forming a calcium-iron ferrite phase.

In a second aspect of the present invention, there is a hydrogen chloride-scavenger comprising calcium-iron oxide composite particles having a BET specific surface area of 0.1 to 100 $m^2/g$ and an iron atom content of 1 to 500 moles based on 100 moles of calcium atom, the iron atoms of not less than 50% based on the total amount of the iron atoms contained in the calcium-iron oxide composite particles being bonded with calcium atom for forming a calcium-iron ferrite phase.

In a third aspect of the present invention, there is a chlorine-containing resin molded product comprising: a resin comprising a chlorine-containing resin and a hydrogen chloride-scavenger which is dispersed in said resin, the hydrogen chloride-scavenger comprising calcium-iron oxide composite particles having a BET specific surface area of 0.1 to 100 $m^2/g$ and an iron atom content of 1 to 500 moles based on 100 moles of calcium atom, the iron atoms of not less than 50% based on the total amount of the iron atoms contained in the calcium-iron oxide composite particles being bonded with calcium atom for forming a calcium-iron ferrite phase; and the ratio value of calcium atom in the hydrogen chloride-scavenger to 2 chlorine atoms in the resin being 0.5 to 2.0.

DETAILED DESCRIPTION OF THE INVENTION

Figure 1:
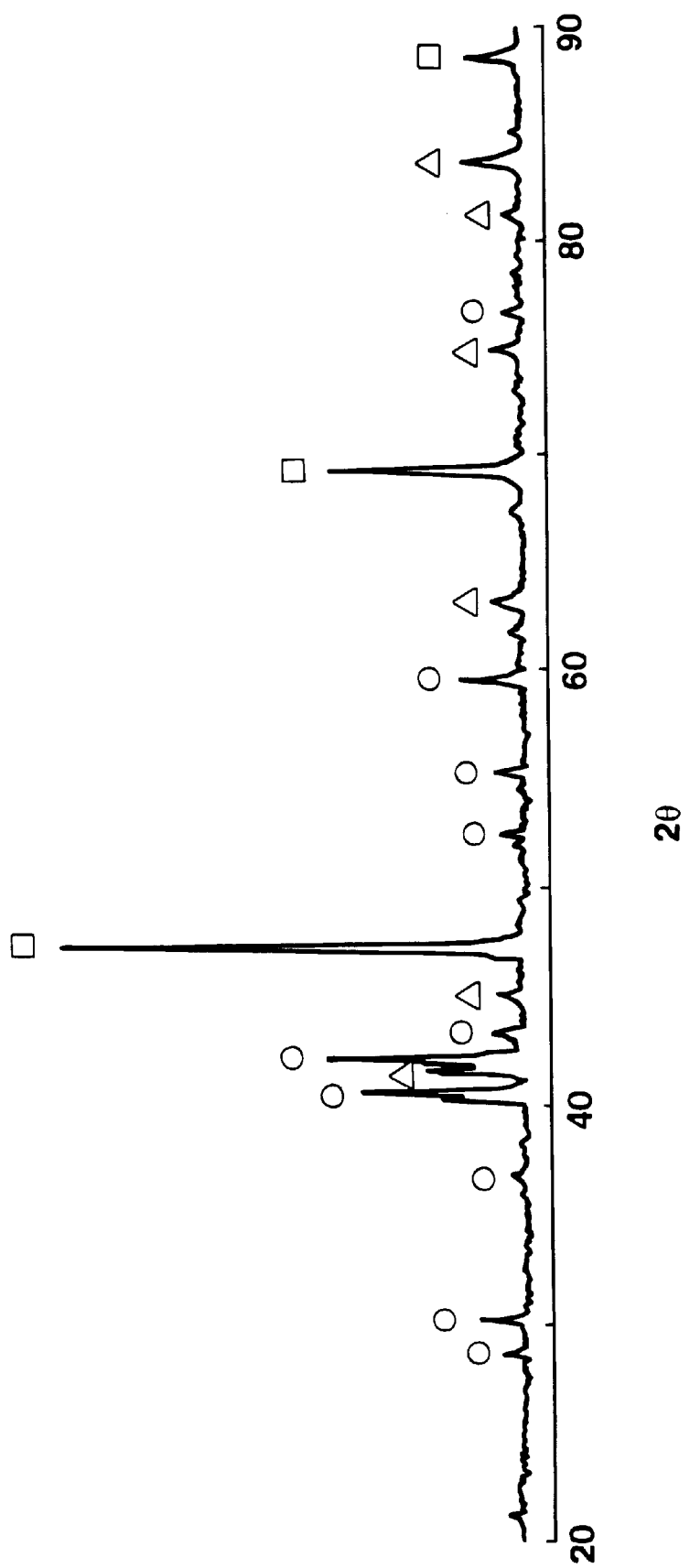
FIG. 1 is an X-ray diffraction pattern showing a composition of a calcium-iron oxide composite particles obtained in Example 1 according to the present invention.

The present invention is explained in more detail below.

First, calcium-iron oxide composite particles as a constituent of the hydrogen chloride-scavenger according to the present invention are described.

The calcium-iron oxide composite particles constituting the hydrogen chloride-scavenger according to the present invention, have an average particle size of usually 0.01 to 10 $\mu$m, preferably 0.05 to 5 $\mu$m, more preferably 0.1 to 2 $\mu$m.

The BET specific surface area of the calcium-iron oxide composite particles according to the present invention is usually 0.1 to 100 $m^2/g$, preferably 0.5 to 20 $m^2/g$, more preferably 1 to 10 $m^2/g$. When the BET specific surface area is less than 0.1 $m^2/g$, the chlorine-capturing effect becomes low. On the other hand, when the BET specific surface area is more than 100 $m^2/g$, it becomes difficult to uniformly knead the calcium-iron oxide composite particles in a resin material composed mainly of chlorine-containing resins.

The calcium-iron oxide composite particles according to the present invention, have an iron atom content of usually 1 to 500 moles, preferably 5 to 200 moles, more preferably 10 to 50 moles based on 100 moles of calcium atom. When the iron atom content less than 1 mole, the catalytic action of iron atom becomes low, and the hydrogen chloride-capturing effect also becomes as low as that of such a case where a calcium compound such as calcium carbonate is used singly. On the other hand, when the iron atom content is more than 500 moles, the calcium atom content in the calcium-iron oxide composite particles becomes too low, so that it is necessary to use a very large amount of the calcium-iron oxide composite particles in order to ensure an amount of calcium required for fixing hydrogen chloride.

In accordance with the present invention, it is required that not less than 50%, preferably not less than 70% of the iron atom contained in the calcium-iron oxide composite particles, forms a calcium-iron ferrite phase. When the iron atom forming such a calcium-iron ferrite phase is less than 50%, the hydrogen chloride-capturing effect cannot be sufficiently enhanced, and further, the content of iron compound particles composed of such iron atom which does not contribute to formation of the calcium-iron ferrite phase, is increased, so that the chlorine-containing resin is deteriorated in quality and properties due to the catalytic action of the iron compound particles when heated to excessively high temperature.

As the calcium-iron ferrite phase composed of the iron and calcium atoms, there may be exemplified calcium-iron ferrite phases composed of at least one crystal phase selected from the group consisting of $Ca_2Fe_2O_5$, $CaFe_2O_4$, $CaFe_4O_7$, $Ca_3Fe_{15}O_{25}$ and $CaFe_5O_7$.

The calcium-iron oxide composite particles may contain other crystal phases such as calcium crystal phase and iron compound crystal phase than calcium-iron ferrite phases.

Meanwhile, each calcium-iron oxide composite particle may contain a plurality of crystal phases, or the calcium-iron oxide composite particles may be in the form of mixed particles which have different crystal phases from each other. In the below-mentioned process for the production of the calcium-iron oxide composite particles according to the present invention, in the case of a powder metallurgy process, each calcium-iron oxide composite particle tend to contain a plurality of crystal phases, while in the case of a mixing process, the calcium-iron oxide composite particles tend to be composed of mixed particles having different crystal phases from each other.

The process for producing the calcium-iron oxide composite particles according to the present invention are explained below.

The calcium-iron oxide composite particles according to the present invention may be produced by a powder metallurgy process, e.g., a process of dry- or wet-mixing calcium compound particles with iron compound particles, heating and calcining the mixed particles and then pulverizing the resultant calcined product. Alternatively, the calcium-iron oxide composite particles according to the present invention may be produced by a mixing process, e.g., a process of mixing calcium-iron ferrite particles, calcium compound particles and iron compound particles together at a predetermined weight ratio.

(i) the powder metallurgy process for producing the composite oxide particles according to the present invention is described below.

As the calcium compound particles, there may be used, for example, calcium carbonate particles, calcium oxide particles, calcium hydroxide particles or the like.

The average particle size of the calcium compound particles is usually 0.01 to 10 µm, preferably 0.1 to 5 µm.

The BET specific surface area of the calcium compound particles is usually 0.1 to 100 m²/g, preferably 1 to 50 m²/g.

As the iron compound particles, there may be used iron oxide particles or iron oxide hydroxide particles. Examples of the iron oxide particles may include hematite particles, maghemite particles, magnetite particles or the like. Examples of the iron oxide hydroxide particles may include goethite particles, akaganeite particles, lepidocrocite particles or the like.

The individual iron compound particles may be of a spherical shape, an octahedral shape, a hexahedral shape, a granular shape, a spindle shape or an acicular shape.

In the case where the iron compound particles have a spherical shape, an octahedral shape, a hexahedral shape or a granular shape, the average particle size thereof is usually 0.01 to 10 µm, preferably 0.1 to 5 µm, and the BET specific surface area thereof is usually 0.1 to 200 m²/g, preferably 1 to 100 m²/g. In the case of the spindle-shaped iron compound particles, the average major axis diameter thereof is usually 0.1 to 1.0 µm, preferably 0.1 to 0.8 µm, and the BET specific surface area thereof is usually 10 to 200 m²/g, preferably 10 to 100 m²/g. Further, in the case of the acicular iron compound particles, the average major axis diameter thereof is usually 0.1 to 1.0 µm, preferably 0.1 to 0.8 µm, and the BET specific surface area thereof is usually 10 to 200 m²/g, preferably 10 to 100 m²/g.

The mixing ratio of the iron compound particles to the calcium compound particles is such that the iron atom content of the obtained calcium-iron oxide composite particles is usually 1 to 500 moles, preferably 5 to 200 moles, more preferably 10 to 50 moles based on 100 moles of calcium atom.

The iron compound particles and the calcium compound particles may be mixed together by either a dry-mixing method using an attrition mill, a Henschel mixer, a sand mill or the like, or a wet-mixing method using a wet-attritor, a homogenizer or the like in which water is used as a dispersing medium.

Incidentally, in the case of the wet-mixing method, it is preferred to dehydrate or dry the treated particles after the mixing.

The calcining temperature is preferably 800 to 1,500° C., more preferably 800 to 1,200° C. In addition, the calcination treatment is preferably conducted in air which is readily available for the treatment. Further, the calcination time is preferably 0.5 to 5 hours.

After the calcination treatment, the resultant calcined product is preferably dry-pulverized until particles having a predetermined particle size are obtained. As the pulverizers, there may be used a pin-type mill, a sand mill, a hammer mill or the like.

(ii) The mixing process for producing the calcium-iron oxide composite particles according to the present invention is described.

In the mixing process, there may be used the same calcium compound particles and iron compound particles as those used in the above-mentioned powder metallurgy process.

The calcium-iron ferrite particles may be produced by preliminarily mixing the calcium compound particles and the iron compound particles in stoichiometric amounts, calcining the mixed particles and then pulverizing the resultant calcined product.

The mixing ratio of the calcium compound particles to the iron compound particles may be determined so as to obtain a stoichiometric composition of the ferrite, namely such that the Ca:Fe ratio becomes either 1:1, 1:2, 1:4 or 1:5.

However, in the present invention, it is not necessarily required to strictly adjust the Ca:Fe ratio to the stoichiometric composition, and the Ca:Fe ratios which are substantially the same as the stoichiometric composition, may also be adopted.

It is preferred that the iron compound particles, the calcium compound particles and the calcium-iron ferrite particles are mixed together by a dry-mixing method using an attrition mill, a Henschel mixer, a sand mill or the like.

The calcination temperature may be appropriately adjusted within the range of 800 to 1,500° C. so as to obtain an aimed crystal phase of calcium-iron ferrite. Further, the calcination treatment may be followed by quenching or the like, if required, whereby a stable calcium-iron ferrite crystal phase can be produced in a limited temperature range. The calcination treatment is preferably conducted in air which is readily available for the treatment.

The calcined product obtained after the calcination treatment is preferably dry-pulverized until particles having a predetermined particle size are obtained.

The hydrogen chloride-scavenger according to the present invention comprises the calcium-iron oxide composite particles.

Next, the chlorine-containing resin molded product according to the present invention is described.

The chlorine-containing resin molded product according to the present invention comprises usually 20 to 80% by weight, preferably 30 to 50% by weight of and usually 80 to 20% by weight, preferably 70 to 50% by weight of a resin composed mainly of a chlorine-containing resin.

The content of the hydrogen chloride-scavenger in the chlorine-containing resin molded product according to the present invention, is adjusted such that the ratio value of calcium atom in the hydrogen chloride-scavenger to 2 chlorine atoms in the resin composed mainly of chlorine-containing resin (hereinafter sometimes referred to merely as "Ca/2Cl") is usually 0.5 to 2.0, preferably 1 to 1.5. When the atomic ratio value is less than 0.5, the hydrogen chloride-capturing effect becomes low. On the other hand, when the atomic ratio value is more than 2, the resin is deteriorated in properties such as strength.

The chlorine-containing resin molded product according to the present invention, has a chlorine-fixativity of usually not less than 50%, preferably not less than 70%, more preferably not less than 75%.

The "chlorine-fixativity" means a percentage of hydrogen chloride fixed (immobilized) as calcium chloride by the hydrogen chloride-scavenger, based on the total amount of hydrogen chloride generated when the resin composed mainly of chlorine-containing resin is heated and thermally decomposed. As recognized from the above, the percentage thereof can be expressed by an amount of chlorine fixed and, therefore, referred to as "chlorine-fixativity". The chlorine-fixativity can be measured by such a method as described hereinafter.

The process for producing the chlorine-containing resin molded product according to the present invention, is described below.

The chlorine-containing resin molded product according to the present invention, can be produced by intimately pre-mixing the resin composed mainly of chlorine-containing resin with the hydrogen chloride-scavenger according to the present invention at a predetermined weight ratio to disperse the hydrogen chloride-scavenger in the resin; and molding the resultant mixture into any aimed shape such as a sheet-like shape, a plate-like shape, a band-like shape, a pellet-like shape or the like, by an ordinary method.

As the chlorine-containing resins, there may be exemplified those resins composed mainly of chlorine-containing resins such as polyvinyl chloride (chlorine content: usually 50 to 60% by weight), polyvinylidene chloride (chlorine content: usually 70 to 80% by weight), chlorinated polyethylene (chlorine content: usually 30 to 60% by weight), chlorinated polypropylene (chlorine content: usually 20 to 70% by weight), chlorinated polyethers (chlorine content: about 45.8% by weight) or the like.

The resin composed mainly of chlorine-containing resin, may contain chlorine usually in an amount of usually about 20 to about 80% by weight.

The hydrogen chloride-scavenger is added to the resin composed mainly of chlorine-containing resin, such that the ratio value of calcium atom in the hydrogen chloride-scavenger to 2 chlorine atoms in the resin composed mainly of chlorine-containing resin is usually 0.5 to 2.0, preferably 1 to 1.5.

For example, the hydrogen chloride-scavenger is mixed with the resin composed mainly of chlorine-containing resin at the weight ratio of the hydrogen chloride-scavenger according to the present invention to the resin composed mainly of chlorine-containing resin of usually 20:80 to 80:20, preferably 30:70 to 50:50.

The hydrogen chloride-scavenger can be uniformly dispersed in the resin composed mainly of chlorine-containing resin by applying a strong shear force to the mixture while heating using a kneader or an extruder.

The heating temperature upon dispersing the hydrogen chloride-scavenger in the resin composed mainly of chlorine-containing resin, is preferably 120 to 170° C., more preferably 150 to 160° C.

Meanwhile, the chlorine-containing resin molded product may contain various ordinary additives such as a lubricant, a plasticizer, an anti-oxidant, an ultraviolet absorber, various stabilizers or the like.

The amount of the additives added is preferably not more than 50% by weight based on the weight of the resin composed mainly of chlorine-containing resin. When the amount of the additives is more than 50% by weight, the moldability tends to be deteriorated.

The reason why hydrogen chloride generated upon combustion of the chlorine-containing resin molded product obtained by mixing and kneading the hydrogen chloride-scavenger according to the present invention with the resin composed mainly of chlorine-containing resin, can be sufficiently captured, is considered as follows.

In this regard, such a case where the hydrogen chloride-scavenger according to the present invention is mixed and kneaded with a polyvinyl chloride resin as a typical chlorine-containing resin, is explained below.

First, when the heating temperature is increased to near 200° C., a part of the polyvinyl chloride resin starts to be decomposed. The hydrogen chloride generated by the decomposition of the resin is reacted with $Fe^{3+}$ which forms a crystal structure in the calcium-iron ferrite phase or $Fe^{3+}$ in the iron oxide particles, thereby producing ferric chloride as expressed by the following formula (1):

$$Fe^{3+} + 3HCl \rightarrow FeCl_3 + 3H^+ \tag{1}$$

The thus-produced ferric chloride is extremely unstable at a temperature of near 200° C. and, therefore, readily thermally decomposed, thereby releasing active chlorine Cl*. As a result, the ferric chloride itself is converted into original $Fe^{3+}$ as expressed by the following formula (2).

$$FeCl_3 \rightarrow Fe^{3+} + 3Cl^* \tag{2}$$

On the other hand, the active chlorine Cl* is reacted with $Ca^{2+}$ in the calcium-iron ferrite phase or Ca in calcium oxide (CaO) particles existing adjacent thereto, and fixed as calcium chloride or the like, as expressed by the following reaction formula (3).

$$Ca^{2+} + 2Cl^* \rightarrow CaCl_2 \tag{3}$$

As described above, it has been considered that in the case where the hydrogen chloride-scavenger according to the present invention is mixed and dispersed in the resin composed mainly of chlorine-containing resin, the $Fe^{3+}$ ion in the calcium-iron ferrite phase and the calcium atom are bonded with each other to form a crystal structure and, therefore, are present adjacent to each other at an atomic level, so that the active chlorine Cl* generated can be more effectively immediately bonded with the calcium atom. In addition, hydrogen chloride generated can be more readily fixed as calcium chloride or the like, as compared to the case where a composition obtained by simply mixing the calcium compound particles such as calcium carbonate particles and the iron oxide particles.

Further, the reason why the resin composed mainly of chlorine-containing resin in which the hydrogen chloride-scavenger according to the present invention is mixed and blended, is neither decomposed nor deteriorated even when the temperature is excessively increased, is considered as follows.

That is, for example, when a polyvinyl chloride resin in which the hydrogen chloride-scavenger according to the present invention is mixed and blended, is heated to near 200° C., a part of the resin is decomposed, so that ferric chloride and active chlorine Cl* are produced in the same manner as shown in the formulae (1) and (2). The thus-produced ferric chloride and active chlorine Cl* accelerate a dehydrochlorination reaction and polyene-forming reaction of the polyvinyl chloride resin, thereby causing decomposition and deterioration of the polyvinyl chloride resin accompanying with discoloration thereof.

However, it is considered that since the hydrogen chloride-scavenger according to the present invention are composed of such calcium-iron oxide composite particles containing a calcium-iron ferrite phase formed by iron and calcium atoms which are adjacent to each other at an atomic level, the active chlorine Cl* can be immediately stabilized as calcium chloride as shown in the formula (3), thereby inhibiting the dehydrochlorination reaction and the polyene-forming reaction.

On the other hand, it is considered that in the case where the calcium compound particles and the iron oxide particles are simply mixed and blended in the chlorine-containing resin, the individual iron and calcium atoms are microscopically dispersed in the resin in the form of different compounds respectively, and are separately each other through the resin present therebetween, so that the dehydrochlorination reaction and the polyene-forming reaction of the polyvinyl chloride resin cannot be sufficiently prevented. Further, it is considered that when the amount of iron oxide particles which are present singly is increased, the dehydrochlorination reaction and the polyene-forming reaction of the polyvinyl chloride resin is rather accelerated by the catalytic action of these iron oxide particles, thereby causing decomposition and deterioration of the resin with discoloration thereof.

The chlorine-containing resin molded product according to the present invention is extremely excellent in thermal stability as compared to conventional ones, for example, can be prevented from undergoing deterioration in quality or properties even when heated at 190° C. for 1.5 hours.

The hydrogen chloride-scavenger according to the present invention is composed of the calcium-iron oxide composite particles containing a calcium-iron ferrite crystal phase formed by calcium and iron atoms which are adjacent to each other at an atomic level. Therefore, in the case where the hydrogen chloride-scavenger according to the present invention is preliminarily mixed and kneaded in the resin composed mainly of chlorine-containing resin and the mixture is formed into a chlorine-containing resin molded product, hydrogen chloride generated upon fire or incineration thereof can be effectively captured and fixed. Besides, the chlorine-containing resin used therein can be prevented from being deteriorated in quality and properties even when heated to a high temperature.

Accordingly, the chlorine-containing resin molded product using the hydrogen chloride-scavenger according to the present invention, are suitable as materials used in various application fields, such as interior and exterior building materials, materials for transportation means, structural materials, agricultural materials for greenhouse culture or the like.

EXAMPLES

The present invention will be explained in more detail hereinafter with reference to the following examples and comparative examples.

The respective properties were evaluated by the following methods.

<Measurement of BET Specific Surface Area>

The BET specific surface area was expressed by a value measured by a BET method.

<Analysis of Constituent Elements>

The contents of respective elements constituting the calcium-iron oxide composite particles were measured by a fluorescent X-ray spectroscopy device 3063 M-type (manufactured by Rigaku Denki Co., Ltd.) according to JIS K0119 "General rule of fluorescent X-ray analysis".

<Determination of Crystal Phase by X-ray Diffraction>

The crystal phase of a material constituting the calcium-iron oxide composite particles, was identified by an X-ray diffraction method using "X-ray Diffractometer RAD-IIA" (manufactured by Rigaku Denki Co., Ltd.) (measuring conditions: target: Fe, lamp voltage: 40 kV, lamp current: 25 mA) at a diffraction angle 2θ of 20 to 90°.

<Evaluation of Chlorine-fixativity>

70 to 80 mg of a chlorine-containing resin molded product was combusted by a combustion tester QF-02 type (manufactured by Mitsubishi Chemical Corp.). The combustion conditions were at a temperature of 700° C. for 7 minutes while feeding $O_2$ gas at 100 ml/min. The obtained residue was dissolved in 250 ml of ion-exchange water, and the obtained solution was subjected to screening. The resultant filtrate as a liquid sample to be tested, was measured by a mercury (II) thiocyanate absorptiometric method according to JIS K-0101, thereby determining an amount of chlorine ion (Cl$^-$) which amount was expressed by a percentage. The chlorine-fixativity S (%) was calculated from the following formula.

$$S(\%)=(C/T)\times 100$$

wherein C represents an amount (g) of chlorine in the residue; and T represents an amount (g) of chlorine contained in the chlorine-containing resin molded product.

<Evaluation of Thermal Stability>

A chlorine-containing resin molded product having a size of 30 mm (length)×30 mm (width)×1 mm (thickness) was placed in a gear-type accelerated aging tester GPHH-201 M-type (manufactured by Tabaiespec Co., Ltd.) maintained at a temperature of 190° C. and observed concerning whether or not any discoloration was caused, thereby evaluating the thermal stability of the molded product.

Example 1

<Production of Calcium-iron Oxide Composite Particles>

19.6 g of calcium carbonate particles having an average particle size of 1.1 μm and a BET specific surface area of 2.0 m$^2$/g (extra pure reagent produced by Katayama Kagaku Kogyo Co., Ltd.) and 5.5 g (35 mole, calculated as Fe atom, based on 100 mole of Ca atom) of granular hematite (α-Fe$_2$O$_3$) particles having an average particle size of 0.30 μm and a BET specific surface area of 3.9 m$^2$/g (produced by Toda Kogyo Corp.) were dry-mixed and calcined at 900° C. for one hour. The obtained calcined product was dry-pulverized by a pin-type mill, thereby obtaining calcium-iron oxide composite particles each containing crystal phases of calcium oxide (CaO) (marked by "□" in FIG. 1), calcium-iron ferrite (Ca$_2$Fe$_2$O$_5$) (marked by "○" in FIG. 1) and hematite (α-Fe$_2$O$_3$) (marked by "Δ" in FIG. 1), as shown in an X-ray diffraction pattern of FIG. 1. Iron atom of 85% based on the total amount of iron atoms contained in the calcium-iron oxide composite particles, contributed for forming a calcium-iron ferrite (Ca$_2$Fe$_2$O$_5$) crystal phase, and the calcium-iron oxide composite particles had an average particle size of 0.19 μm and a BET specific surface area of 8.9 m$^2$/g.

<Production of Chlorine-containing Resin Molded Product Composed Mainly of Chlorine-containing Resin>

30.0 g of polyvinyl chloride having an average degree of polymerization of 1,300 (chlorine content: 56.8%; produced by Shin-Etsu Kagaku Kogyo Co., Ltd.), 20.2 g of a hydrogen chloride-scavenger of the obtained calcium-iron oxide composite particles (ratio value of calcium atom in the calcium-iron oxide composite particles to 2 chlorine atoms in the polyvinyl chloride resin: 1), 18.0 g of dioctyl phthalate as a plasticizer (produced by Dai-Hachi Kagaku Kogyo Co., Ltd.) and 1.5 g of butyl tin-maleate ester as a stabilizer (tin-based stabilizer; produced by Dai-Nippon Ink Kagaku Kogyo Co., Ltd.) were mixed together. The resultant mixture was kneaded at 155° C. for 3 minutes using a hot roll mill (twin-roll mill; roll width: 0.5 mm), thereby obtaining a sheet.

The obtained sheet was cut into two small sheets each having a size of 150 mm (length)×100 mm (width). Both small sheets were placed in a mold having a thickness of 1 mm, and heated (heating temperature: 160° C., applied pressure: 10 kg/cm$^2$, heating time: 2.5 minutes) and then pressed (applied pressure: 50 kg/cm$^2$, pressing time: 0.5 minute) using a hot press. Next, the obtained sheet was forcibly cooled by a cold press (applied pressure: 50 kg/cm$^2$), thereby obtaining a sheet-like polyvinyl chloride resin molded product (amount of calcium-iron oxide composite particles in the chlorine-containing resin molded product: 29.0% by weight).

The thus-obtained sheet-like polyvinyl chloride resin molded product was subjected to the above chlorine-fixativity evaluation procedure. As a result, it was determined that the chlorine-fixativity was 83.5%. Further, as a result of the evaluation of thermal stability, it was determined that the molded product underwent no discoloration.

Example 2

23.2 g of calcium carbonate particles having an average particle size of 1.1 μm and a BET specific surface area of 2.0 m$^2$/g (extra pure reagent produced by Katayama Kagaku Kogyo Co., Ltd.) and 1.9 g (10 mole, calculated as Fe atom, based on 100 mole of Ca atom) of granular hematite (α-Fe$_2$O$_3$) particles having an average particle size of 0.30 μm and a BET specific surface area of 3.9 m$^2$/g (produced by Toda Kogyo Corp.) were dry-mixed and calcined at 900° C. for three hours. The obtained calcined product was dry-pulverized by a pin-type mill, thereby obtaining calcium-iron oxide composite particles each containing crystal phases of calcium oxide (CaO), hematite (α-Fe$_2$O$_3$) and calcium-iron ferrite (Ca$_2$Fe$_2$O$_5$). It was determined that the iron atom of 95% based on the total amount of iron atoms contained in the calcium-iron oxide composite particles, contributed for forming a calcium-iron ferrite phase (Ca$_2$Fe$_2$O$_5$), and the calcium-iron oxide composite particles had an average particle size of 0.42 μm and a BET specific surface area of 4.2 m$^2$/g.

30.0 g of polyvinyl chloride having an average degree of polymerization of 1,300 (chlorine content: 56.8%; produced by Shin-Etsu Kagaku Kogyo Co., Ltd.), 15.4 g of the above-obtained calcium-iron oxide composite particles (ratio value of calcium atom in the calcium-iron oxide composite particles to 2 chlorine atoms in the polyvinyl chloride resin: 1), 18.0 g of dioctyl phthalate as a plasticizer (produced by Dai-Hachi Kagaku Kogyo Co., Ltd.) and 1.5 g of butyl tin-maleate ester as a stabilizer (tin-based stabilizer; produced by Dai-Nippon Ink Kagaku Kogyo Co., Ltd.) were mixed together. The resultant mixture was kneaded at 155° C. for 3 minutes using a hot roll mill (twin-roll mill; roll width: 0.5 mm), thereby obtaining a sheet.

The obtained sheet was cut into two small sheets each having a size of 150 mm (length)×100 mm (width). Each small sheet was placed in a mold having a thickness of 1 mm, and heated (heating temperature: 160° C., applied pressure: 10 kg/cm$^2$, heating time: 2.5 minutes) and then pressed (applied pressure: 50 kg/cm$^2$, pressing time: 0.5 minute) using a hot press. Next, the obtained sheet was forcibly cooled by a cold press (applied pressure: 50 kg/cm$^2$), thereby obtaining a sheet-like polyvinyl chloride resin molded product (amount of calcium-iron oxide composite particles in the chlorine-containing resin molded product: 23.7% by weight).

The thus-obtained sheet-like polyvinyl chloride resin molded product was subjected to the above chlorine-fixativity evaluation procedure. As a result, it was determined that the chlorine-fixativity was 80.5%. Further, as a result of the evaluation of thermal stability, it was determined that the molded product underwent no discoloration.

Comparative Example 1

The same procedure as defined in Example 2 was conducted except that 25.9 g of a dry mixture composed of uncalcined calcium carbonate particles and uncalcined hematite (α-Fe$_2$O$_3$) particles (ratio value of calcium atom in the dry mixture to 2 chlorine atoms in the polyvinyl chloride resin: 1), 30.0 g of polyvinyl chloride, 18.0 g of dioctyl phthalate and 1.5 g of the tin-based stabilizer were used, thereby obtaining a brown-colored polyvinyl chloride resin molded product.

As a result of the chlorine-fixativity evaluation, it was determined that the chlorine-fixativity was 33.4%. Further, as a result of the thermal stability evaluation, it was determined that the molded product was colored black.

Comparative Example 2

19.6 g of calcium carbonate particles and 5.5 g (35 mole, calculated as Fe atom, based on 100 mole of Ca atom) of hematite (α-Fe$_2$O$_3$) particles having an average particle size of 1.2 μm and a BET specific surface area of 1.0 m$^2$/g were dry-mixed and calcined at 800° C. for three hours. The obtained calcined product was dry-pulverized by a pin-type mill, thereby obtaining calcium-iron oxide composite particles each containing crystal phases of calcium oxide (CaO), calcium-iron ferrite ($Ca_2Fe_2O_5$) and hematite ($\alpha$-$Fe_2O_3$). It was determined that iron atom of 45% based on the total amount of iron atoms contained in the calcium-iron oxide composite particles, contributed for forming a calcium-iron ferrite phase, and the calcium-iron oxide composite particles had an average particle size of 0.26 μm and a BET specific surface area of 6.2 $m^2$/g.

The same procedure as defined in Example 1 was conducted except that 20.2 g of the obtained composite oxide particles (ratio value of calcium atom in the calcium-iron oxide composite particles to 2 chlorine atoms in the polyvinyl chloride resin: 1) were used, thereby obtaining a brown-colored polyvinyl chloride resin molded product (amount of calcium-iron oxide composite particles in the chlorine-containing resin molded product: 29.0% by weight).

As a result of the chlorine-fixativity evaluation, it was determined that the chlorine-fixativity was 62.0%. Further, as a result of the thermal stability evaluation, it was determined that a peripheral portion of the test piece was colored black.

Comparative Example 3

The same procedure as defined in Example 1 was conducted except that 24.0 g of calcium carbonate, 30.0 g of polyvinyl chloride, 18.0 g of dioctyl phthalate and 1.5 g of the tin-based stabilizer were used, thereby obtaining a white-colored polyvinyl chloride resin molded product.

As a result of the chlorine-fixativity evaluation, it was determined that the chlorine-fixativity was 22.3%. Further, as a result of the thermal stability evaluation, it was determined that the molded product was colored yellow.

Examples 3 to 6, Comparative Examples 4 to 5 and Reference Example 1

The same procedure as defined in Example 1 was conducted except that kind and amount of the calcium compound particles and kind and amount of the iron oxide particles were varied, thereby obtaining hydrogen chloride-scavengers. Further, the same procedure as defined in Example 1 was conducted except that kind and amount of the calcium-iron oxide composite particles and kind of the resin composed mainly of chlorine-containing resin were varied, thereby obtaining chlorine-containing resin molded products in which the hydrogen chloride-scavengers were dispersed.

Various production conditions and various properties of the calcium-iron oxide composite particles and the chlorine-containing resin molded products are shown in Table 1.

Reference Example 2

19.6 g of calcium carbonate ($CaCO_3$) particles having an average particle size of 1.1 μm and a BET specific surface area of 2.0 $m^2$/g (extra pure reagent produced by Katayama Kagaku Kogyo Co., Ltd.) and 47.0 g (300 mole % calculated as Fe atom based on Ca atom) of granular hematite ($\alpha$-$Fe_2O_3$) particles having an average particle size of 0.30 μm and a BET specific surface area of 3.9 $m^2$/g (produced by Toda Kogyo Corp.) were dry-mixed and calcined at 900° C. for one hour. The obtained calcined product was dry-pulverized by a pin-type mill, thereby obtaining calcium-iron oxide composite particles each containing crystal phases composed of calcium oxide (CaO), calcium-iron ferrite ($Ca_2Fe_2O_5$, $CaFe_2O_4$) and hematite ($\alpha$-$Fe_2O_3$) It was determined that iron atom of 85% based on the total amount of iron atoms contained in the calcium-iron oxide composite particles, contributed for forming calcium-iron ferrite phases ($Ca_2Fe_2O_5$, $CaFe_2O_4$), and the calcium-iron oxide composite particles had an average particle size of 1.0 μm and a BET specific surface area of 1.4 $m^2$/g.

By using 248.2 g of the obtained calcium-iron oxide composite particles (ratio value of calcium atom in the calcium-iron oxide composite particles to 2 chlorine atoms in the polyvinyl chloride resin: 3.5), it was attempted to produce a polyvinyl chloride resin molded product in the same manner as defined in Example 1 (amount of calcium-iron oxide composite particles in the chlorine-containing resin molded product: 83.4% by weight). However, it was not possible to obtain any molded product.

TABLE 1

| Examples, Comparative Examples and Reference Example | Production conditions of calcium-iron oxide composite particles Calcium compound particles | | |
|---|---|---|---|
| | Kind | Average particle size (μm) | BET specific surface area ($m^2$/g) |
| Example 2 | Calcium carbonate | 1.1 | 2.0 |
| Example 3 | Calcium carbonate | 1.1 | 2.0 |
| Example 4 | Calcium carbonate | 1.1 | 2.0 |
| Example 5 | Calcium hydroxide | 0.27 | 10.0 |
| Example 6 | Calcium oxide | 4.5 | 0.4 |
| Comparative Example 1 | Calcium carbonate | 1.1 | 2.0 |
| Comparative Example 2 | Calcium carbonate | 1.1 | 2.0 |
| Comparative Example 3 | Calcium carbonate | 1.1 | 2.0 |
| Comparative Example 4 | Calcium carbonate | 1.1 | 2.0 |
| Comparative Example 5 | Calcium oxide | 1.1 | 0.1 |
| Reference Example 1 | Calcium carbonate | 1.1 | 2.0 |

| Examples, Comparative Examples and Reference Example | Production conditions of calcium-iron oxide composite particles Iron compound particles | | | |
|---|---|---|---|---|
| | Kind | Average particle size (μ/m) | BET specific surface area ($m^2$/g) | Shape of particle |
| Example 2 | Hematite | 0.30 | 3.9 | Granular |
| Example 3 | Hematite | 0.30 | 3.9 | Granular |
| Example 4 | Magnetite | 0.29 | 4.1 | Octahedral |
| Example 5 | Goethite | 0.20 | 85 | Acicular |
| Example 6 | Hematite | 0.30 | 3.9 | Granular |
| Comparative Example 1 | Hematite | 0.30 | 3.9 | Granular |
| Comparative Example 2 | Hematite | 1.2 | 1.0 | Granular |
| Comparative Example 3 | — | — | — | — |
| Comparative Example 4 | Hematite | 0.30 | 3.9 | Granular |
| Comparative Example 5 | Hematite | 1.2 | 1.0 | Granular |
| Reference Example 1 | Hematite | 3.0 | 3.9 | Granular |

TABLE 1-continued

| Examples, Comparative Examples and Reference Example | Production conditions of calcium-iron oxide composite particles | | |
|---|---|---|---|
| | Fe/Ca (mole %) | Heating and calcining conditions | |
| | | Calcining temperature (° C.) | Time (hr) |
| Example 2 | 10 | 900 | 3 |
| Example 3 | 100 | 920 | 3 |
| Example 4 | 200 | 920 | 3 |
| Example 5 | 35 | 920 | 1 |
| Example 6 | 200 | 900 | 1 |
| Comparative Example 1 | 10 | — | — |
| Comparative Example 2 | 35 | 800 | 1 |
| Comparative Example 3 | — | — | — |
| Comparative Example 4 | 0.5 | 920 | 3 |
| Comparative Example 5 | 10 | 920 | 1 |
| Reference Example 1 | 35 | 900 | 1 |

Properties of calcium-iron oxide composite particles

| Ex., Com-. Ex., And Ref. | Average particle size (μm) | BET specific surface area (m²/g) | Fe/Ca (mole %) | Calcium-iron ferrite phase | |
|---|---|---|---|---|---|
| | | | | Kind | Percentage of Fe in ferrite phase to total Fe (mole %) |
| Ex. 2 | 0.42 | 4.2 | 10 | Ca₂Fe₂O₅ | 95 |
| Ex. 3 | 0.90 | 1.7 | 100 | Ca₂Fe₂O₅ | 90 |
| Ex. 4 | 1.0 | 1.4 | 200 | Ca₂Fe₂O₅ CaFe₂O₄ | 95 |
| Ex. 5 | 0.60 | 2.8 | 35 | Ca₂Fe₂O₅ | 95 |
| Ex. 6 | 1.4 | 1.0 | 200 | Ca₂Fe₂O₅ CaFe₂O₄ | 70 |
| Com. Ex. 1 | — | — | — | — | — |
| Com. Ex. 2 | 0.26 | 6.2 | 35 | Ca₂Fe₂O₅ | 45 |
| Com. Ex. 3 | — | — | — | — | — |
| Com. Ex. 4 | 0.47 | 3.9 | 0.5 | Ca₂Fe₂O₅ | 95 |
| Com. Ex. 5 | 1.8 | 1.0 | 10 | Ca₂Fe₂O₅ | 45 |
| Ref. Ex. 1 | 0.19 | 8.9 | 35 | Ca₂Fe₂O₅ | 85 |

Properties of chlorine-containing resin molded product

| Ex., Com. Ex., and Ref. Ex. | Chlorine-containing resin | | Chlorine-fixa-tivity (%) | Amount of calcium-iron oxide composite particles (wt%) | Thermal stability (190° C., 90 min) |
|---|---|---|---|---|---|
| | Kind | Chlorine content (wt%) | Ca/2Cl value | | | |
| Ex. 2 | Polyvinyl chloride resin | 56.8 | 1.0 | 80.5 | 23.7 | ○ Undis-colored |
| Ex. 3 | Polyvinyl chloride resin | 56.8 | 1.0 | 91.4 | 39.7 | ○ Undis-colored |
| Ex. 4 | Polyvinyl chloride resin | 56.8 | 1.5 | 99.5 | 49.7 | ○ Undis-colored |
| Ex. 5 | Polyvinyl-idene chloride resin | 73.2 | 1.0 | 80.0 | 34.4 | ○ Undis-colored |
| Ex. 6 | Polyvinyl chloride resin | 56.8 | 1.0 | 76.2 | 51.1 | ○ Undis-colored |
| Com. Ex. 1 | Polyvinyl chloride resin | 56.8 | 1.0 | 33.4 | — | X Colored black |
| Com. Ex. 2 | Polyvinyl chloride resin | 56.8 | 1.0 | 62.0 | 29.0 | X Colored black |
| Com. Ex. 3 | Polyvinyl chloride resin | 56.8 | 1.0 | 22.3 | — | Δ Colored yellow |
| Com. Ex. 4 | Polyvinyl chloride resin | 56.8 | 1.0 | 42.0 | 21.5 | ○ Undis-colored |
| Com. Ex. 5 | Polyvinyl chloride resin | 56.8 | 1.0 | 35.2 | 23.7 | X Colored black |
| Ref. Ex. 1 | Polyvinyl chloride resin | 56.8 | 0.4 | 26.7 | 14.0 | ○ Undis-colored |

What is claimed is:

1. A chlorine-containing resin molded product comprising:
   a resin comprising a chlorine-containing resin, and
   a hydrogen chloride-scavenger dispersed in said resin, which comprises calcium-iron oxide composite particles having a BET specific surface area of 1 to 100 $m^2/g$ and containing iron atom in an amount of 1 to 500 moles based on 100 moles of a calcium atom,
   the iron atom of not less than 50% based on the total amount of iron atom contained in said calcium-iron oxide composite particles being bonded with calcium atom for forming a calcium-iron ferrite phase, and
   the ratio value of calcium atom in said hydrogen chloride-scavenger to 2 chlorine atoms in said resin being 0.5 to 2.0.

2. A chlorine-containing resin molded product according to claim 1, wherein the amount of said hydrogen chloride-scavenger in said chlorine-containing resin molded product is 20 to 80% by weight based on the weight of the chlorine-containing resin molded product.

3. A chlorine-containing resin molded product according to claim 1, wherein the BET specific surface area thereof is 1 to 10 $m^2/g$.

4. A method of using calcium-iron oxide composite particles for scavenging hydrogen chloride,
   wherein said calcium-iron oxide composite particles have a BET specific surface area of 1 to 100 $m^2/g$ and contain iron atom in an amount of 1 to 500 moles based on 100 moles of calcium atom, and werein the iron atom of not less than 50% based on the total amount of iron atom contained in said calcium-iron oxide composite particles is bonded with calcium atom for forming a calcium-iron ferrite phase
said method comprising heating and uniformly dispersing the calcium-iron oxide composite particles into a chlorine-containing resin while applying shear force to the resin/particle mixture by kneading or extruding the mixture.

* * * * *